Figure 1:
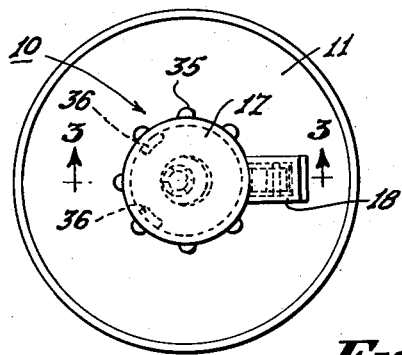

June 9, 1959

R. V. BURT 2,889,966

LIQUID METERING DISPENSER

Filed Sept. 13, 1957

INVENTOR.
ROBERT V. BURT,
BY Allen & Allen
ATTORNEYS.

United States Patent Office 2,889,966
Patented June 9, 1959

2,889,966

LIQUID METERING DISPENSER

Robert V. Burt, Cincinnati, Ohio, assignor to The Procter & Gamble Company, Cincinnati, Ohio, a corporation of Ohio Application September 13, 1957, Serial No. 683,841

3 Claims. (Cl. 222—445)

The present invention relates to an improved liquid measuring and dispensing device which can be attached to a liquid container.

Many kinds and types of liquid metering devices are found in the prior art. However, each one either has certain operating deficiencies or is too complex and expensive for practical application so that none has ever experienced any great degree of success. It is a principal object of the present invention to provide a liquid metering device which is simple in construction, inexpensive to manufacture, and which has the manifold advantages hereinafter enumerated.

Another object of this invention is the provision of a liquid metering device which dispenses a fixed quantity of liquid irrespective of the liquid level within the container.

Still another object of this invention is the provision of a simple liquid metering device which is economical to manufacture.

A further object of this invention is the provision of a metering device of this character having removable means for sealing the liquid contents in the container thus preventing evaporation or liquid loss through spillage while the container with the metering device attached is being handled, stored or shipped.

A still further object is the provision of a metering device which will operate satisfactorily when used with liquids having a tendency to become gummy after relatively short exposures to atmospheric conditions.

Yet another object is the provision of a liquid metering device in which a predetermined quantity of liquid can be metered repeatedly once the liquid container is inverted without returning the container to its upright position after the discharge of each metered quantity.

Briefly stated, in accordance with one aspect of the present invention, a liquid metering device is provided comprising a body including means for attachment to a container neck or spout. The body includes, intermediate its ends, a transverse wall having an aperture. A hinged lid is pivoted to the body wall to cover the end thereof. The transverse wall, the lid and the body wall between the transverse wall and lid comprise a metering chamber. The lid is normally biased to the closed position by means of a spring, and a valve member with a rod extension is suspended from the inner surface of the lid so that the rod extends through the aperture of the transverse wall. The valve itself is outside the metering chamber when the container is inverted and the liquid captured within the chamber is discharged on opening the lid, which action simultaneously moves the valve into sliding engagement with the aperture thereby inhibiting further liquid flow from the container into the metering chamber. A protective cover may be employed to seal the metering chamber from the interior of the container thus preventing leakage and evaporation of liquid when the container is being handled or stored.

Figure 3:
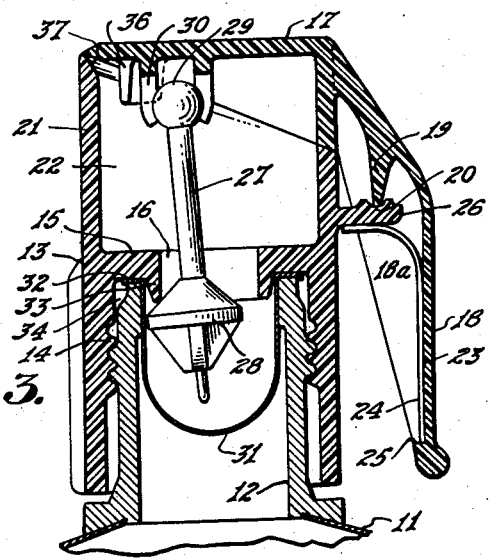
Figure 2:
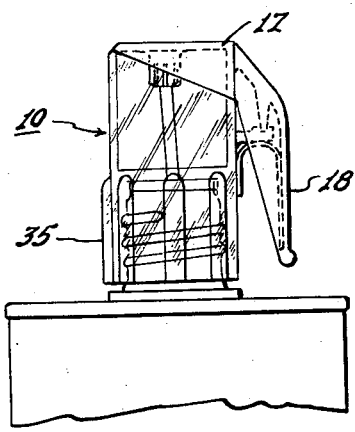
Figure 4:
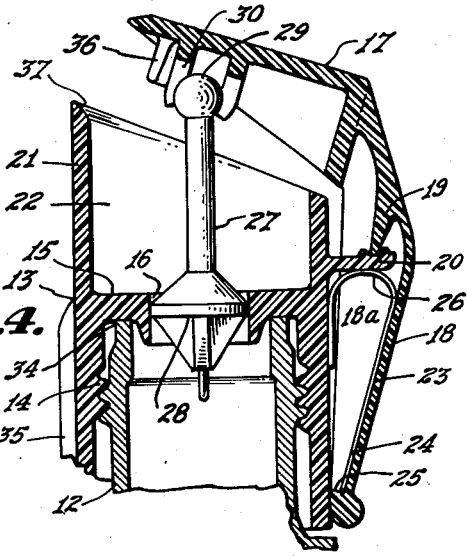
Figure 5:
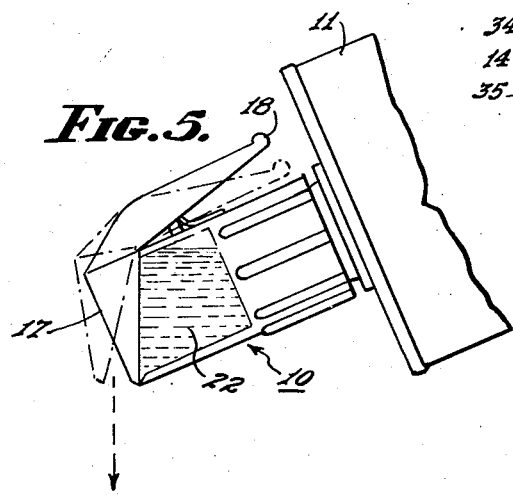

While the specification concludes with claims particularly pointing out and distinctly claiming the subject matter regarded as forming the present invention, it is believed the invention will be better understood from the following description taken in connection with the accompanying drawing in which:

Figure 1 illustrates a plan view of the metering device attached to a container; and Figure 2 is an elevation of the metering device attached to a container wherein the internal structure is partially visible since the metering device shown is constructed of transparent material; and Figure 3 is a cross-section along the lines 3—3 of Figure 1 which illustrates the metering device with the lid in closed position and the protective cover attached; and Figure 4 is an elevation in cross-section of the metering device with the lid in open position and the protective cover removed; and Figure 5 illustrates a typical position of the metering device when used to discharge a measured quantity of liquid.

Referring now to the drawing and particularly Figures 1, 2 and 3, the metering device indicated generally at 10 is shown attached to a conventional liquid container 11 having a spout 12. The metering device 10 comprises a body 13 which may be attached as by the threads 14 or otherwise to the spout 12.

The body 13 is provided with a transverse wall 15 having an aperture 16 therein. A lid 17 having a handle 18 is hingedly connected to the body 13 by means of the pivot 19 resting on the pivot support 20 projecting from the body 13. The wall portion 21 of the body 13 between the transverse wall 15 and lid 17 cooperates with the transverse wall 15 and the lid 17 to define a metering chamber 22.

A spring 23 has the end of one leg 24 resting against an abutment 25 in the handle. Another leg 26 lies against the bottom surface of the pivot support 20. The spring 23 is adapted to urge the lid 17 to the closed position as indicated in Figure 3 and simultaneously functions to hold the pivot 19 against the pivot support 20. The spring 23 may be essentially L-shaped, as shown in Fig. 3 or may be U-shaped as shown in Fig. 4. The spring is retained against lateral displacement by side wall elements 18a on the handle member. The spring may be a flat metal element or may be formed of spring wire.

A rod 27 having a valve 28 at one end and a ball 29 at the other is snapped into engagement with a plurality of flexible ball retainers 30 molded on the bottom surface of the lid 17. The ball 29 when assembled into the retainers 30 forms a ball and socket joint which permits the suspended valve 28 to pivot in any direction. The valve 28 is adapted to slide through the aperture 16 after the ball 29 has been assembled into the retainers 30; and the valve has tapered portions both above and below its largest diameter to facilitate insertion and subsequent operation. Thus, the ball 29 is first assembled to the lid 17 and then the valve 28 is slipped through the aperture 16 until the pivot 19 rests against the pivot support 20. The assembly is completed and held together by placing the spring 23 into the position indicated on the drawing.

A protective cover 31 having a flange 32 may be formed of a flexible plastic material such as polyethylene and inserted into the spout 12. The tapered outer edge of a skirt 33 about the opening 16 in the partition 15 seals the edge of the protective cover against the inner rim of the spout. The purpose of the protective cover 31 is to inhibit air circulation into the container and consequent evaporation and to prevent liquid spillage. This permits the container to be handled, shipped and stored with the metering device attached.

The metering device is prepared for use by first disassembling it from the container spout 12 and then removing and disposing of the protective cover 31. The metering device is then ready for use after being reassembled on the container spout 12. A metered quantity of liquid can be discharged by inclining the container to the position shown in Figure 5, thus allowing liquid within the container to flow into the metering chamber 22. While the device of this invention may be made of any suitable material, including metals, transparent plastics are advantageously employed for making the body of the metering device, and in this event a user can visually observe when the metering chamber has filled. The liquid in the metering chamber is discharged by depressing the handle 18 which simultaneously causes the valve 28 to slide into the aperture 16 so that the parts assume the position shown in Figure 4 thus inhibiting further liquid flow into the metering chamber 22. If necessary, the process may be repeated two or more times without returning the container to its upright position by closing and reopening the cover. And in addition, liquid may be discharged in a continuous stream by depressing the handle just enough to crack the opening between the lid 17 and body 13 so that the valve 28 does not enter fully into the aperture 16. With the lid thus opened, liquid will flow through the aperture 16 and out between the lid and body. This flow may be stopped at any time by either closing the lid or opening it fully.

The cover element may, if desired, be made of non-transparent, colored plastic for appearance or color-coding.

To give the device added rigidity and to facilitate its removal, one or more ribs 35 may be employed about the periphery of the body 13 in order that a user can get a firmer grip on the outer wall surface and to facilitate machine assembly of the metering device to a container.

One or more projections 36 from the inside of the lid 17 as shown in Figures 1 and 3, may also be provided. The projections are contiguous to the inner wall surface 21 of the metering chamber, and can be used to prevent excessive torque from being transmitted to the pivot 19 and pivot support 20 when the metering device is assembled or disassembled from the container spout. The projections 36 also serve as a centering means for the lid and assure that it will fit properly over the metering chamber 22.

In order to reduce dripping from the metering chamber after the lid is opened to discharge its contents, a bevel 37 may be provided around the inner corner of the wall 21. The provision of such a bevel has been found to materially reduce the amount of dripping as compared to the use of a sharp corner.

The cover element preferably has a slantwise engagement with the top wall of the metering chamber as illustrated. This facilitates pouring, makes for a larger opening with a given movement of the handle, and facilitates the provision of a flat top for stacking.

In a preferred embodiment, the pivot point 19 is located at a substantial distance from the end of the handle 18 and the pivot support 20 is located on the body 13 near the transverse dividing wall 15. This location of the pivot support 20 and pivot point 19, coupled with the slantwise engagement of the lid with the body results in a wide opening with a comparatively small movement of the handle, and also moves the lid laterally so as not to interfere with pouring.

While particular embodiments of the invention have been illustrated and described, it will be obvious to those skilled in the art that various changes and modifications can be made without departing from the spirit and scope of the invention and it is intended to cover in the appended claims all such changes and modifications that are within the scope of this invention.

What is claimed as new is:

1. A liquid metering dispenser comprising an open-ended cylindrical body member having an integral transverse dividing wall intermediate its ends, the upper end of said body member being aslant with respect to the axis of the body member, an internal thread formed on the inner wall of said body below said dividing wall for securing the body member to a mating thread on the spout of a container, an aperture in said dividing wall, a pivot support integral with said body member and projecting outwardly in close proximity to the plane of the transverse dividing wall, a lid member having a top wall substantially parallel to the dividing wall of said body member when the lid is in the closed position, an annular skirt-like wall portion depending from said top wall of said lid and terminating in a plane aslant the plane of the top wall of the lid to cover the upper end of said body member and form an enclosed metering chamber inside the body member and above the dividing wall, a handle extending downwardly from said lid and terminating substantially beyond the pivot support, a pivot projecting from said handle and resting on said pivot support, a spring having one leg bearing against the bottom surface of the pivot support and a second leg bearing against the handle, said spring holding the pivot in engagement with the pivot support while normally biasing the lid to the closed position, a valve member slidable through the aperture in the dividing wall of said body, a plurality of ball retainers integral with and extending from the bottom surface of the top wall of said lid, said valve member having a ball at one end in engagement with said ball retainers to form a ball and socket joint, the valve member having a rod extending from said ball through the aperture in said dividing wall of said body so that said valve member is out of engagement with said aperture when the lid is closed whereby a measured quantity of liquid can be dispensed by inverting the dispenser to fill the metering chamber through the aperture, the said handle being depressible to raise the lid thereby allowing the liquid trapped in the metering chamber to discharge while simultaneously sealing the aperture by drawing the valve member into engagement with the aperture.

2. A liquid metering dispenser comprising an open-ended cylindrical body member having an integral transverse dividing wall intermediate its ends, said body member having an upper and lower end, the lower end being provided with a thread for attaching the body member to the spout of a container, the upper end of said body member terminating in a plane lying aslant with respect to the axis of the body member, an aperture in the dividing wall of said body member, a pivot support formed integrally with said body member and projecting from the body member in close proximity to the plane of the transverse dividing wall, a lid member having a top wall and an annular skirt-like extension depending from said top wall, the terminus of said skirt-like extension lying in the same plane as the terminus of the upper end of the body member when the lid is closed so that the skirt-like portion abuts the upper wall of the body member to form a metering chamber inside the body member cavity above the dividing wall, the top wall of the lid member being substantially parallel to the dividing wall in said body member when the lid is closed, a handle extending downwardly from said lid and terminating substantially beyond the pivot support, a pivot projecting from the handle and resting on said pivot support, a spring member having one leg bearing against the bottom surface of the pivot support and a second leg bearing against the handle, said spring member holding the pivot against the pivot support while normally biasing the lid to the closed position, a valve member having an integral stem, said valve member attached for pivotal movement to the inner surface of the top wall of the lid, the said stem extending through the aperture of said dividing wall so that the valve member is outside the metering chamber when the lid is closed whereby a metered quantity of liquid can be trapped in the metering chamber when the dispenser is inverted and the metered liquid can be discharged by depressing the handle to open the lid which simultaneously draws the valve member into engagement with the aperture to inhibit inflow of liquid to the metering chamber.

3. A liquid metering dispenser comprising an open-ended cylindrical body member having an integral transverse dividing wall intermediate its ends, an aperture in said dividing wall, a pivot support extending from said body member in close proximity to the plane of the transverse dividing wall, a lid member having a top wall, said lid member engaging the upper end of said body member to form a metering chamber inside the body member cavity above the dividing wall, a handle extending downwardly from said lid and terminating beyond the pivot support, a pivot projecting from the handle and resting against said pivot support, a spring member having one leg bearing against the bottom surface of the pivot support and a second leg bearing against the handle, said spring member holding the pivot against the pivot support while normally biasing the lid to the closed position, a valve member having an integral stem, said valve member being attached to the inner surface of the top wall of the lid, the said stem extending through the aperture of said dividing wall so that the valve member is outside the metering chamber when the lid is closed whereby a metered quantity of liquid can be trapped in the metering chamber when the dispenser is inverted and the metered liquid can be discharged by depressing the handle to open the lid which simultaneously draws the valve member into engagement with the aperture to inhibit inflow of liquid to the metering chamber.

References Cited in the file of this patent

UNITED STATES PATENTS

| | | |
|---|---|---|
| 1,033,688 | Fuchs | July 23, 1912 |
| 1,052,259 | King | Feb. 4, 1913 |
| 2,017,839 | Berendt | Oct. 22, 1935 |
| 2,159,259 | Dootson | May 23, 1939 |
| 2,331,659 | Cutone | Oct. 12, 1943 |